United States Patent [19]

Peters

[11] Patent Number: 4,794,665
[45] Date of Patent: Jan. 3, 1989

[54] ROTARY CUTTER WITH SERRATED EDGES AND POSITIVE/NEGATIVE AXIAL RAKE

[75] Inventor: Robert W. Peters, Saegertown, Pa.

[73] Assignee: Greenleaf Corporation, Saegertown, Pa.

[21] Appl. No.: 396,818

[22] Filed: Jul. 9, 1982

Related U.S. Application Data

[63] Continuation-in-part of Ser. No. 717,360, Aug. 24, 1976, abandoned, and Ser. No. 813,539, Jul. 7, 1977, abandoned, and Ser. No. 882,993, Mar. 3, 1978, abandoned, and Ser. No. 186,262, Sep. 11, 1980, and Ser. No. 260,349, May 4, 1981, abandoned.

[51] Int. Cl.$^4$ ............................................. B26D 1/12
[52] U.S. Cl. ........................................ 407/58; 407/114
[58] Field of Search ............... 407/113, 114, 115, 116, 407/58

[56] References Cited

U.S. PATENT DOCUMENTS

| | | | |
|---|---|---|---|
| 1,472,960 | 11/1923 | Conklin | 407/58 |
| 2,690,610 | 10/1954 | Begle et al. | 407/36 |
| 3,056,186 | 10/1962 | Greenleaf | 407/41 |
| 3,574,911 | 4/1971 | Penoyar | 407/114 |
| 3,636,602 | 1/1972 | Owen | 407/114 |
| 3,694,876 | 10/1972 | Erkfritz | 407/113 |
| 3,701,187 | 10/1972 | Erkfritz | 407/114 |
| 3,875,631 | 4/1975 | Malinchak | 407/114 |
| 3,955,259 | 5/1976 | Gustafsson | 407/40 |
| 4,115,024 | 9/1978 | Sussmuth | 407/114 |
| 4,140,431 | 2/1979 | Friedline | 407/114 |
| 4,180,355 | 12/1979 | Nanini | 407/113 |
| 4,199,284 | 4/1980 | Kress et al. | 407/114 |

FOREIGN PATENT DOCUMENTS

| | | | |
|---|---|---|---|
| 2549930 | of 1977 | Fed. Rep. of Germany | 407/114 |
| 2431897 | 3/1980 | France | 407/114 |
| 2054427 | 2/1981 | United Kingdom | 407/114 |

Primary Examiner—Fred A. Silverberg
Attorney, Agent, or Firm—Ralph Hammar

[57] ABSTRACT

A rotary cutter having serrated cutting edges formed by the intersection with a cutting face of serrations angularly inclined to the cutting face to provide side clearance for the trailing sides of the serrations.

21 Claims, 3 Drawing Sheets

ROTARY CUTTER WITH SERRATED EDGES AND POSITIVE/NEGATIVE AXIAL RAKE

This application is a continuation-in-part of application Ser. Nos. 717,360, filed 08/24/76, abandoned; 813,539, filed 07/07/77, abandoned; 882,993, filed 03/03/78, abandoned; 186,262, filed 09/11/80; and 260,349, filed 05/04/81 now abandoned all incorporated by reference.

In cutters having inserts with serrated cutting edges, minimal or no clearance on the trailing sides of the serrations has been noted. Attempts have been made to correct this by adjusting the radial and axial rake geometry of the cutters, but this at best is a compromise.

This invention is intended to overcome the problem by inclining the ribs or serrations to provide clearance with the workpiece.

In the accompanying drawings.

Figure 1:
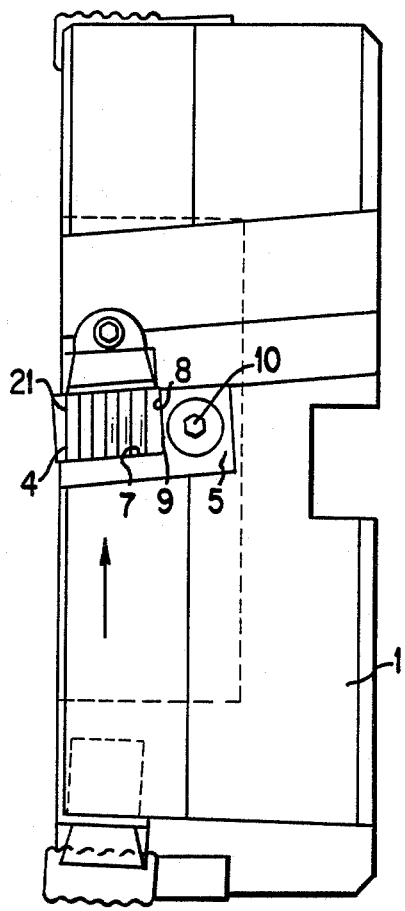
FIG. 1 is an edge view of a cutter with serrated edges.
Figure 2:
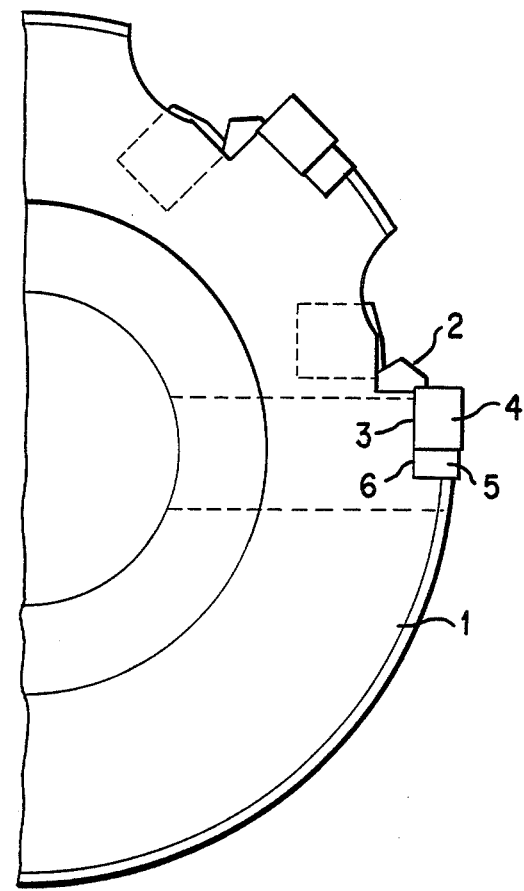
FIG. 2 is an end view of the FIG. 1 cutter.

In the drawing, FIGS. 1 and 2 show a cylindrical milling cutter body 1 having a plurality of axially extending notches 2 angularly spaced about the axis of rotation of the body. Each of the notches has a flat bottom seat 3 for supporting an indexable tungsten carbide insert 4 and an anvil 5. Each anvil has a flat bottom surface 6 resting on the seat and upstanding edge surfaces 7 and 8 which cooperate to provide a corner 9 locating the imperforate generally rectangular insert 4. Each anvil is held in place by a set screw 10. The seats and anvils are identically constructed and the edge surfaces 7, 8 cooperate with the bottom seat 3 to identically position the inserts 4 with relation to the axis of the cutter body.

The inserts 4 are of the "on edge" type, such as shown in application Ser. No. 186,262, filed 09/11/80, incorporated by reference. Each insert consists of a generally rectangular block of cutting material, such as tungsten carbide, having a top surface 11, a bottom surface 12, longitudinal edge surfaces 13, 14 and end edge surfaces 15, 16. The thickness of the insert, the distance between the top and bottom surfaces 11 and 12, is less than the width of the insert, the distance between the longitudinal edge surfaces 13, 14. The length of the insert (the distance between the end edge surfaces 15, 16) is greater than either the width or thickness of the insert. The top and bottom surfaces 11, 12 are at right angles to the longitudinal edge surfaces 13, 14 and to the end edge surfaces 15, 16, and the longitudinal and end edge surfaces are at right angles to each other. The inserts are also made in a shorter style of about half the length of the insert illustrated. The shorter insert has the same thickness as the style illustrated so it can be used on the same cutter body by merely changing anvils 5 to accommodate the shorter insert length. This shorter version has a width about three-fourths its thickness. The shorter length insert requires less width than the longer length insert shown.

Figure 4:
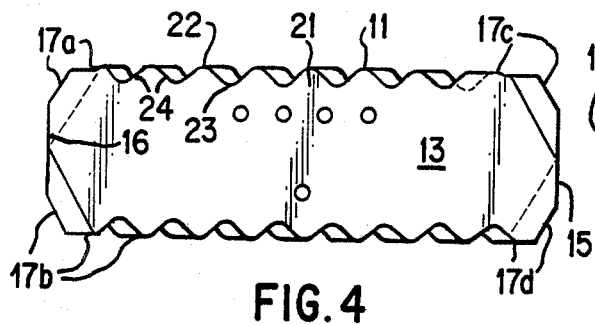
FIG. 4 is a front elevation of the FIG. 3 insert.
Figure 5:
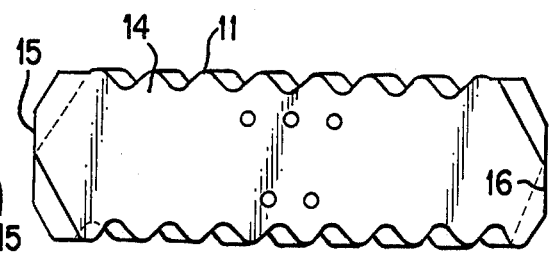
FIG. 5 is an elevation of the opposite face of the FIG. 3 insert.
Figure 3:
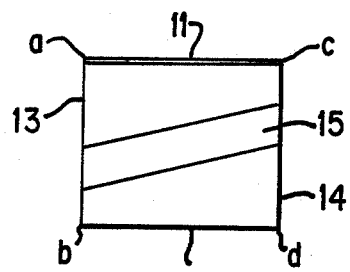
FIG. 3 is an end view of a left-hand negative/positive insert.
Figure 6:
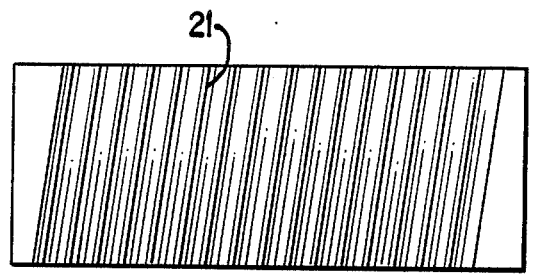
FIG. 6 is a top plan view of the FIG. 3 insert.
Figure 8:
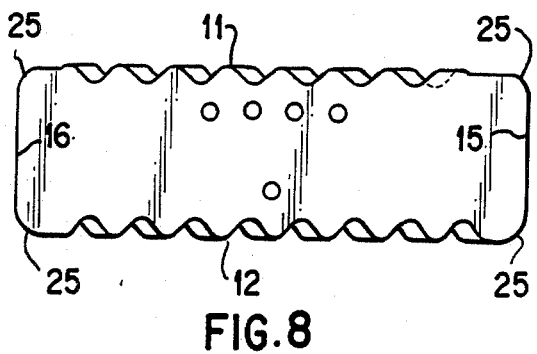
FIG. 8 is a front elevation of the FIG. 7 insert.
Figure 9:
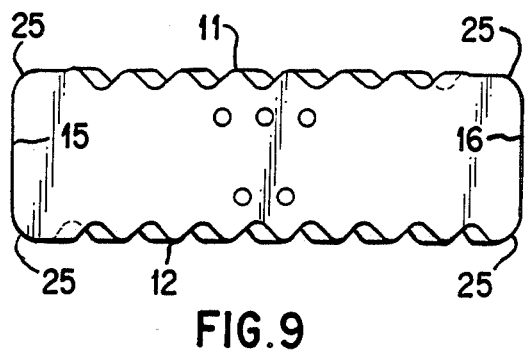
FIG. 9 is an elevation of the opposite face of the FIG. 7 insert.
Figure 7:
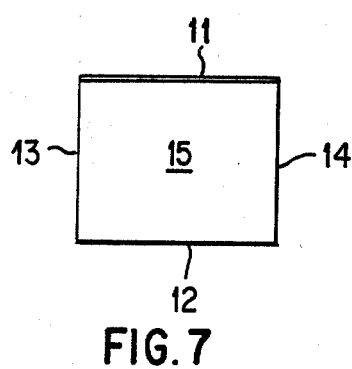
FIG. 7 is an end view of a right-hand double negative insert.
Figure 10:
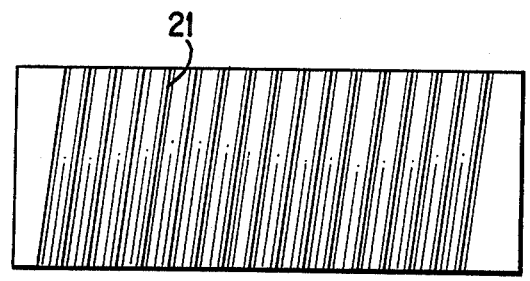
FIG. 10 is a top plan view of the FIG. 7 insert.
Figure 12:
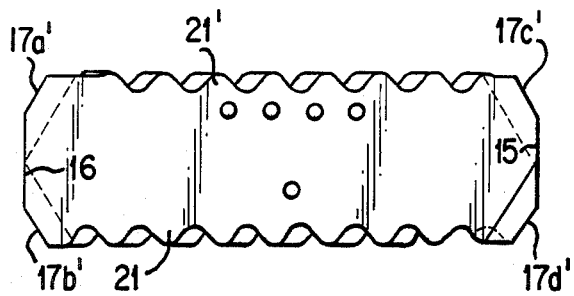
FIG. 12 is a front elevation of the FIG. 11 insert.
Figure 13:
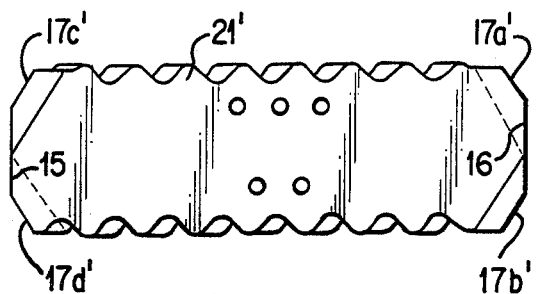
FIG. 13 is an elevation of the opposite face of the FIG. 11 insert.
Figure 11:
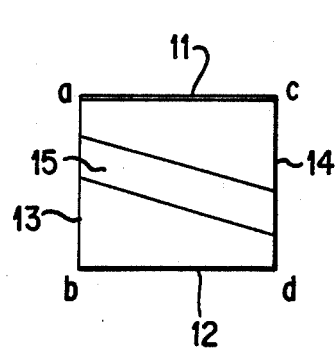
FIG. 11 is an end view of a right-hand negative/positive insert.
Figure 14:
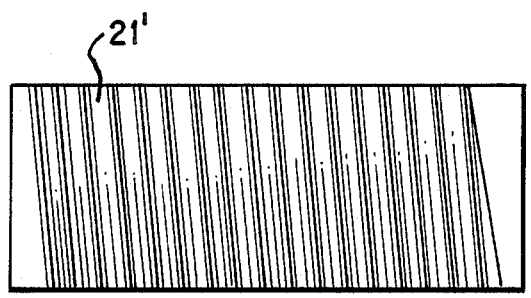
FIG. 14 is a top plan view of the FIG. 11 insert.
Figure 16:
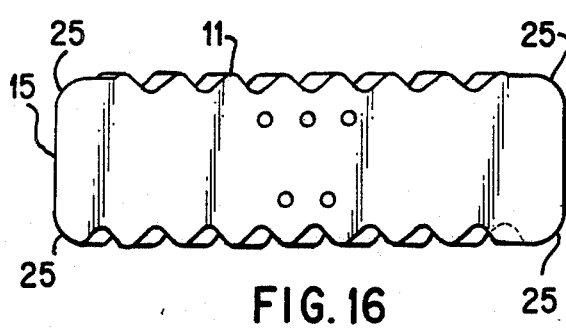
FIG. 16 is a front elevation of the FIG. 15 insert.
Figure 17:
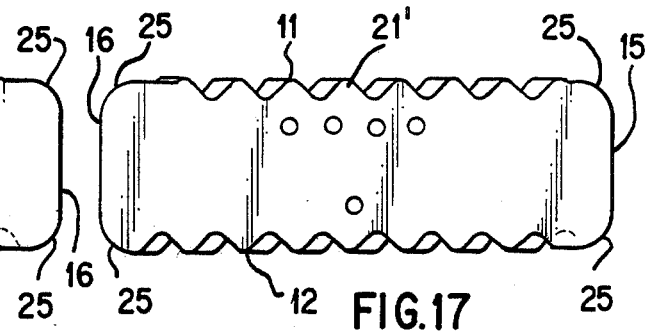
FIG. 17 is an elevation of the opposite face of the FIG. 15 insert.
Figure 15:
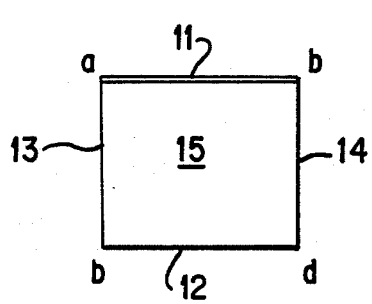
FIG. 15 is an end view of a left-hand double negative insert.
Figure 18:
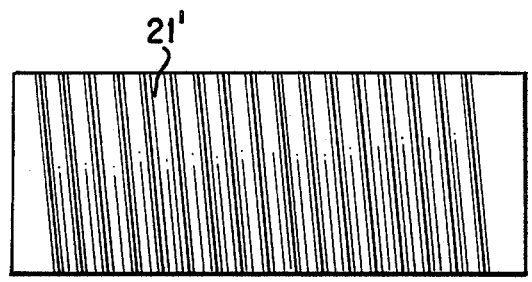
FIG. 18 is a top plan view of the FIG. 15 insert.

In the insert of FIGS. 3–6, there are four main cutting edges, two edges in positions designated as "a" and "b" in FIG. 3 and formed by the intersection of face 13 with top face 11 (designated by ° ° ° ° in FIG. 4) and bottom face 12 (designated by ° in FIG. 4) and two edges in positions designated "c" and "d" in FIG. 3 and formed by the intersection of face 14 with top face 11 (designated by ° ° ° in FIG. 5) and bottom face 12 (designated by ° ° in FIG. 5).

The longitudinal cutting edge in position "a" is in active cutting position, and is called the main active cutting edge. The cutting edges in positions "b", "c" and "d" are in inactive cutting position. The inserts are used in sets of four with the inserts of each set indexed to have the active cutting edges of each insert different, e.g., respectively, ° , ° ° , ° ° ° , ° ° ° ° .

The corner cutting edges 17a, 17b, 17c, 17d each comprise a bevel extending across each corner of the insert. The bevels forming corner cutting edges 17a and 17d extend from face 13 to face 14 across diagonally opposite corners of the insert, as shown in FIG. 4. The bevels forming other cutting edges 17b and 17c extend from face 14 to face 13 across the remaining diagonally opposite corners, as shown in FIG. 5. Each bevel is angled beneath the face from which it extends to provide cutting clearance for the corner cutting edges. The combination of longitudinal and corner cutting edges provides "shear clear" chip removal characteristics of negative-positive inserts. No matter how the inserts are inverted or turned, end for end, or top for bottom, the end edge surface which comes into cutting position will have the same position relative to the cutter body as every other end edge surface which is in cutting position. The end edge surfaces 15, 16 are not cutting edges, but have only an insert locating function. The corner cutting edges 17a, 17b, 17c, 17d are identically positioned on the cutter body and have the same cutting action no matter how the insert is indexed into active cutting position.

In each of the upper end lower surfaces 11, 12 is a series of identically spaced generally sinusoidal ribs or serrations 21 at an acute angle to the longitudinal edge faces 13, 14 and perpendicular to a plane through the axis of the cutter. Each of the ribs 21 has a rounded crest 22 and a correspondingly rounded root 23 and straight sides 24 extending between the crests and roots. While this is not mathematically exactly sinusoidal, it is close enough to be a working approximation of sinusoidal shape. There are two sets of ribs 21, one set being in the top face 11 and creating the serrated cutting edges ° ° ° and ° ° ° ° , and the other set being in the bottom face 12 and creating the serrated cutting edges ● and ○ ○. The edges ○, ○ ○, ○ ○ ○ and ○ ○ ○ ○ are out of phase with each other when in active position. Cutting edge ○ ○ ○ ○, shown in active cutting position "a" in FIG. 4, is out of phase with cutting edge ○ ○ ○ when it is moved into cutting position "a." Likewise, cutting edge ○ ○, which is in active position when corner edge 17b is moved into position "a" is out of phase with cutting edge ○ when corner 17d is indexed into position "a." In each case, two cutting edges are formed by a single set of serrated ribs and are in out of phase relation with each other because the sets of serrations are differently spaced from the ends 15, 16 of the inserts. The end result is that each insert has four main cutting edges which are in out of phase relation with each other when in active cutting position. In summary, there are four main cutting edges on each insert. The inserts are used in sets of four with each insert mounted on a cutter body which identically positions the inserts with relation to the axis of the cutter body. Each insert is oriented to present a different main cutting edge in active cutting position, e.g., ○, ○ ○, ○ ○ ○, ○ ○ ○ ○. Although the serrated cutting edges are in out of phase relation, the corner cutting edges 17a, 17b, 17c, 17d are always in phase with each other when in active cutting position. This results in a higher quality finish. The corner edges each share in the total finish cut. The longitudinal cutting edges each perform only a quarter of the cut.

The inserts of FIGS. 3-6 are for left-hand cut, negative radial rake and positive axial rake. The positive axial rake means that the cutting face (13 or 14) for the active cutting edge ( ○, ○ ○, ○ ○ ○, or ○ ○ ○ ○ ) of each insert is inclined at a positive rake angle to the axis of rotation of the cutter. If the serrations 21 were perpendicular to the cutting face (13 or 14), there would be insufficient cutting clearance between the work and the trailing sides of the ribs or serrations, and interference between the serrations and the work would occur. To prevent this interference, the serrations 21 are inclined to the cutting face (13 or 14) at an angle opposite to the positive axial rake angle so that when the inserts are mounted on the cutter body, the serrations or ribs 21 lie in planes which are perpendicular to the axis of rotation of the cutter body. This provides proper cutting clearance between the trailing sides of the serrations 21 and the work and eliminates interference between the ribs and the work.

The insert of FIGS. 7, 8, 9 and 10 is for right-hand cut. Except for the corner edges, the insert of FIGS. 7-10 is the same as the insert of FIGS. 3-6, and corresponding structure is identified by the same reference numerals.

The insert of FIGS. 7-10 is for right-hand cut, negative radial, negative axial rake. In place of the beveled corner edges 17a, 17b, 17c and 17d of FIGS. 3-6, the insert has cylindrical corners 25, each tangent to the top and bottom surfaces 11, 12 and the end surfaces 15, 16. The cylindrical or arcuate corner edges 25 are in phase with each other and therefore cooperate to provide the finish surface of the cut made by the sets of inserts. The inclination of the negative axial rake is opposite to the inclination of the serrations or ribs 21 which form the major cutting edges of the inserts. The inclination of the ribs 21 provides proper cutting clearances on the trailing sides of the serrations and in this respect has the same function as the serrations 21 in FIGS. 3-6. The cutting faces formed by the intersections of the longitudinal edge faces 13, 14 with the leading ends of the ribs 21 are inclined at the negative axial rake angle. The angular inclination shown in FIG. 10 places the ribs 21 in planes perpendicular to the axis of rotation of the cutter body. There is, accordingly, good cutting clearance on both sides of the ribs 21.

In FIGS. 11 through 14 are shown inserts for right-hand cut, negative/positive, which are similar to the on-edge inserts of FIGS. 3-6 except that changes are made due to the right-hand cut as compared to the left-hand cut of FIGS. 3-6. The differences are the bevels forming the cutting edges 17a', 17b', 17c' and 17d' are at the opposite angle to the bevels forming the cutting edges 17a, 17b, 17c, 17d, and the inclination of the ribs or serrations 21' to the cutting faces 13, 14 is opposite to the inclination of the ribs 21 to the surfaces 13, 14. The end surfaces of the inserts of FIGS. 11-14 have the same locating function as the end surfaces 15, 16 of the FIGS. 3-6 insert. The cutting faces 13, 14 of the inserts 11-14 are the same as the correspondingly numbered cutting faces of the FIGS. 3-6 insert. The cutting action of the FIGS. 11-14 inserts, when mounted on a cutter body for right-hand rotation, is the same as the cutting action of the FIGS. 3-6 inserts when mounted on a cutter body for left-hand rotation. The differences between the inserts are due to the directional nature of the inserts. The FIGS. 3-6 insert is usable for left-hand cut while the FIGS. 11-14 insert is usable for right-hand cut. The inclination of the serrations or ribs 21' of the FIGS. 11-14 inserts brings the ribs into a plane perpendicular to the axis of rotation of the cutter and thereby provides cutting clearance on both sides of the ribs in the same manner as the ribs 21 of the FIGS. 3-6 inserts.

The inserts of FIGS. 15-18 which are for left-hand cut, double negative, are identical with the inserts for FIGS. 11-14 with the following exceptions: (1) The bevels forming the corner cutting edges 17a', 17b', 17c' and 17d' are omitted. (2) The corners are replaced by cylindrical surfaces 25 identical with the cylindrical corner surfaces shown in FIGS. 8 and 10 which are perpendicular to the cutting faces 13 and 14 and tangent to the end faces 15, 16 and the top and bottom surfaces 11, 12. When mounted on the cutter body, the cylindrical corner edge faces 25 register with each other and the other cutting edges ○, ○ ○, ○ ○ ○, and ○ ○ ○ ○ are out of phase with each other as in the previously described construction. Since the axial inclination of the inserts for left-hand cut negative rake is the same as the axial inclination of the inserts for right-hand cut positive rake, the inclination of the serrations or ribs 21' brings the serrations into planes perpendicular to the axis of rotation and thereby provides proper cutting clearance for the sides of the ribs.

The ability to provide serrated cutting action with inserts having serrations inclined to provide proper cutting clearance on the trailing sides of the serrations is an important addition to the art which has not heretofore been possible.

Figure 19:
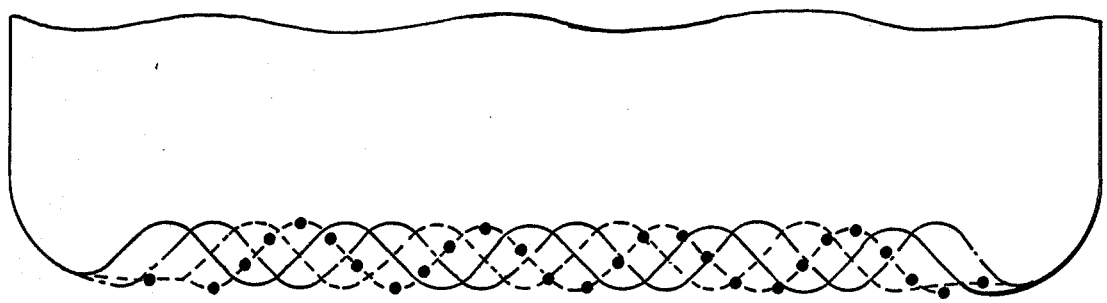
FIG. 19 is a diagrammatic view showing the cutting action of the inserts.

In applicant's inserts, the end edges 15, 16 are not cutting edges but have solely a locating function. The purpose of these edges is to identically position the inserts in each index position. The cutting action of applicant's inserts comes from the serrated edges 11, 12 and from the corner edges 25, 17a-d, 17a'-d'. The serrated edges break up the cut and permit higher speed cutting without chattering. As shown in FIG. 19, the serrated edges are out of phase with each other and each acts to complement the other in chip removal. The serrated cutting edges are used in sets, with each insert indexed to a different position. Each insert has four serrated edges, each out of phase with the other. This is illustrated in FIG. 19, where the inserts are aligned one on top of the other with the end and corner edges in alignment or in phase, and the serrated edges out of phase. The cutting action demonstrated in FIG. 19 is that which would be obtained if the four inserts there depicted were mounted on four successive seats of the milling cutter.

Stated differently, FIG. 19 represents the cutting edges presented to the workpiece by four inserts mounted on the cutter body 1, each insert being indexed to present a different cutting edge in the active cutting position and with the end faces 15, 16 and corner edges 25 in alignment or in phase with each other.

I claim:

1. An indexable cutting insert with cutting faces adapted to be oriented at axial rake angles which are either negative or positive and with cutting edges formed by the intersection with said cutting faces of the leading ends of sinusoidal serrations, said serrations being inclined axially relative to said cutting faces at an angle which provides cutting clearance for the trailing sides of said serrations.

2. The construction of claim 1 in which the insert is a generally rectangular imperforate block of cutting material with generally parallel top and bottom surfaces and side and end faces between said surfaces, the serrations being in said surfaces and the inclination of the serration in the top surface being opposite to the inclination of the serrations in the bottom surface when viewed from the same side face.

3. A cutter comprising a body having a plurality of angularly spaced insert seats, each constructed to identically position an indexable insert with relation to the axis of the cutter body, an insert on each seat constructed and mounted as defined in claim 2.

4. A cutter comprising a body having a plurality of angularly spaced insert seats, each constructed to identically position an indexable insert with relation to the axis of the cutter body, an insert on each seat constructed and mounted as defined in claim 1 in which the insert is a generally rectangular imperforate block of cutting material with generally parallel top and bottom surfaces and side and end faces in planes at right angles to each other and to said top and bottom surfaces, the intersection of said side faces with said top and bottom surfaces forming four main cutting edges of sinusoidal wave configuration, the leading side face being adapted to be positioned in the plane of said axial rake angle and the uppermost face having serrations extending transverse to said side faces and inclined relative to said leading side face at an angle which provides cutting clearance for the trailing sides of the serrations.

5. A cutter comprising a body having a plurality of angularly spaced insert seats, each constructed to identically position an indexable insert with relation to the axis of the cutter body, an insert on each seat constructed and mounted as defined in claim 1.

6. The cutter of claim 5 in which said serrations are in a plane perpendicular to the axis of the cutter body.

7. An indexable on edge insert adapted to be supported on a flat platform on a cutter body and crowded edgewise against walls upstanding from a corner of such platform, said insert comprising a flat and generally rectangular imperforate block of cutting material having top and bottom surfaces and faces along opposite side edges constituting the cutting faces of four main cutting edges, each of which may be indexed into active cutting position, said main cutting edges being defined by the intersection of said top and bottom surfaces and said side faces, and serrations of sinusoidal wave form in said top and bottom surfaces intersecting said side faces to provide said main cutting edges with serrations.

8. The insert of claim 7 in which each end of the block has an end face adapted for abutment with one of said corner walls to identically locate the block endwise relative to said platform in each index position.

9. The insert of claim 8 in which the end faces are not cutting faces.

10. The construction of claim 8 plus each end of said block having clearance faces extending along such end and each defining at opposite ends the finish cutting edge for two of said main cutting edges along the respective sides of said block, said clearance faces sloping in opposite directions across the block end from said finish cutting edges and being separated from each other by a surface extending across the block and adapted for abutment with one of said corner walls to locate the block endwise relative to said platform.

11. A cutting insert as defined in claim 10 in which said clearance faces at the ends of said block are of generally trapezoidal shape.

12. A cutting insert as defined in claim 11 in which said abutment surface at each end of said insert extends diagonally across the end.

13. A cutting insert as defined in claim 11 in which said end abutments are flat with generally parallel side edges.

14. A cutting insert as defined in claim 10 in which said abutment surfaces on said block ends are disposed in parallel planes normal to said sides of said block.

15. A cutter comprising a body having a plurality of angularly spaced insert seats, each constructed to identically position an indexable insert with relation to the axis of the cutter body, an insert on each seat constructed and mounted as defined in claim 10.

16. A cutter comprising a body having a plurality of angularly spaced insert seats, each constructed to identically position an indexable insert with relation to the axis of the cutter body, an insert on each seat constructed and mounted as defined in claim 8.

17. An indexable on edge insert adapted to be supported on a flat platform on a cutter body and crowded edgewise against walls upstanding from a corner of such platform, said insert comprising a flat and generally rectangular imperforate block of cutting material having top and bottom surfaces and faces along opposite side edges constituting the cutting faces of four main cutting edges, each of which may be indexed into active cutting position, said main cutting edges being defined by the intersection of said top and bottom surfaces and said side faces, end faces at opposite ends of the block, each adapted for abutment with one of said corner walls to identically locate the block endwise relative to said platform, and serrations of sinusoidal wave configuration in said top and bottom surfaces intersecting said side faces to provide serrations in each of said four main cutting edges, the spacing of the serrations of each of said four main cutting edges when in active cutting position from each end face being different so the serrations of said four main cutting edges are out of phase with each other.

18. The insert of claim 17 in which the serrations in the top surface are inclined toward one end of the block and the serrations in the bottom surface are inclined toward the opposite end of the block.

19. A cutter comprising a body having a plurality of angularly spaced insert seats, each constructed to identically position an indexable insert with relation to the axis of the cutter body, an insert on each seat constructed and mounted as defined in claim 18.

20. A cutter comprising a body having a plurality of angularly spaced insert seats, each constructed to identically position an indexable insert with relation to the axis of the cutter body, an insert on each seat constructed and mounted as defined in claim 17.

21. A cutter comprising a body having a plurality of angularly spaced insert seats, each constructed to identically position an indexable insert with relation to the axis of the cutter body, an indexable insert on each seat comprising a generally rectangular imperforate blade of cutting material with a plurality of end faces for locating the insert in index position and a plurality of main cutting edges which are moved into cutting position as the insert is indexed, each main cutting edge when in cutting position having at its leading end a corner edge for finishing, at least two of the inserts located in different index positions on said body having sinusoidal serrated main cutting edges with the serrations out of phase with each other and having the corner edges in phase with each other.

* * * * *